(12) United States Patent
Aspinall et al.

(10) Patent No.: US 9,651,069 B2
(45) Date of Patent: May 16, 2017

(54) MOUNTING SYSTEM FOR PORTABLE DEVICE

(71) Applicant: iOttie, Inc, Hackensack, NJ (US)

(72) Inventors: John Aspinall, Staten Island, NY (US); James Byun, Brooklyn, NY (US); Kyu Seop Lee, Basking Ridge, NJ (US); Alan Yu Tung Ng, New York, NY (US)

(73) Assignee: IOTTIE, INC., New York, NY (US)

(*) Notice: Subject to any disclaimer, the term of this patent is extended or adjusted under 35 U.S.C. 154(b) by 295 days.

(21) Appl. No.: 14/230,488

(22) Filed: Mar. 31, 2014

(65) Prior Publication Data
US 2015/0282345 A1 Oct. 1, 2015

(51) Int. Cl.
*F16B 2/04* (2006.01)
*H04M 1/04* (2006.01)

(52) U.S. Cl.
CPC .............. *F16B 2/04* (2013.01); *H04M 1/04* (2013.01)

(58) Field of Classification Search
CPC ...... F16M 11/04; F16M 11/041; F16M 11/10; F16M 13/02; F16B 21/09; A47B 13/021; A47B 63/00; A47B 96/061; A47B 96/06; A47F 5/08; A47F 5/0823; A47F 13/04; A47K 10/10
See application file for complete search history.

(56) References Cited

U.S. PATENT DOCUMENTS

| | | | | |
|---|---|---|---|---|
| 2,474,722 A * | 6/1949 | Blume | ..................... | A45B 9/00 135/65 |
| 4,247,216 A * | 1/1981 | Pansini | ..................... | B25G 3/18 15/1.7 |
| 4,928,461 A * | 5/1990 | King | ..................... | A01D 46/247 56/332 |
| 6,055,762 A * | 5/2000 | Philpot | .................. | A01K 77/00 43/11 |
| 6,062,518 A * | 5/2000 | Etue | ..................... | B60R 11/0241 224/542 |
| 6,082,922 A * | 7/2000 | Cheng | .................. | A47D 13/063 403/102 |
| 6,190,082 B1 * | 2/2001 | Butterfield | ........... | A47D 13/066 256/26 |
| 8,715,116 B2 * | 5/2014 | Cerasoli | ................. | A63B 63/00 403/325 |
| 8,827,341 B2 * | 9/2014 | Sofield | ..................... | B60R 11/02 296/37.12 |
| 8,985,544 B1 * | 3/2015 | Gulick, Jr. | ............. | F16M 13/00 248/176.1 |

(Continued)

*Primary Examiner* — Cassandra Davis
(74) *Attorney, Agent, or Firm* — Lucas & Mercanti, LLP

(57) ABSTRACT

A mounting system for a portable device includes a top case, a bottom case coupled to the top case, and first and second arms on two sides of the top case and the bottom case and spaced away from each other. Each of the first and second arms include a first section and a second section. In a first state where the top case is pushed toward the bottom case and a first distance is between the first and second arms, the first sections protrude outside from the top case. In a second state where the second sections are pushed toward each other and a second distance smaller than the first distance is between the first and second arms, the first sections do not protrude outside from the top case or protrude outside from the top case less than in the first state.

18 Claims, 5 Drawing Sheets

(56) References Cited

U.S. PATENT DOCUMENTS

2007/0281619 A1* 12/2007 Chen .................. B60R 11/02
                                            455/42
2009/0095856 A1*  4/2009 Nakatani ............ F16B 7/042
                                            248/177.1

* cited by examiner

MOUNTING SYSTEM FOR PORTABLE DEVICE

TECHNICAL FIELD

This disclosure generally relates to a mounting system and more particularly, a mounting system for a portable device.

BACKGROUND

Portable devices, in general, refer to portable electronic devices, such as a mobile phone, a portable Global Positioning System (GPS) receiver or navigation device, a media player, a tablet or like devices. Such portable electronic devices usually have a planar shape and a touch-screen display. Examples include Apple® Iphone®, Ipod®, Ipad®, Samsung Galaxy™ smartphones, HTC™ smart phones, etc.

Although a mobile phone, or a tablet can be a very mobile computing device, in some situations a user may prefer to mount the mobile phone or the tablet in a stationary position or may wish to mount a tablet or a mobile phone in a single location while still providing a degree of position adjustability. For example, a user may determine that a mounted mobile phone or tablet can in some cases be easier to view and/or operate, e.g., a smartphone can be mounted to the dashboard or the windshield of an automobile so that the driver can easily see the screen of the smart phone while driving.

BRIEF DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
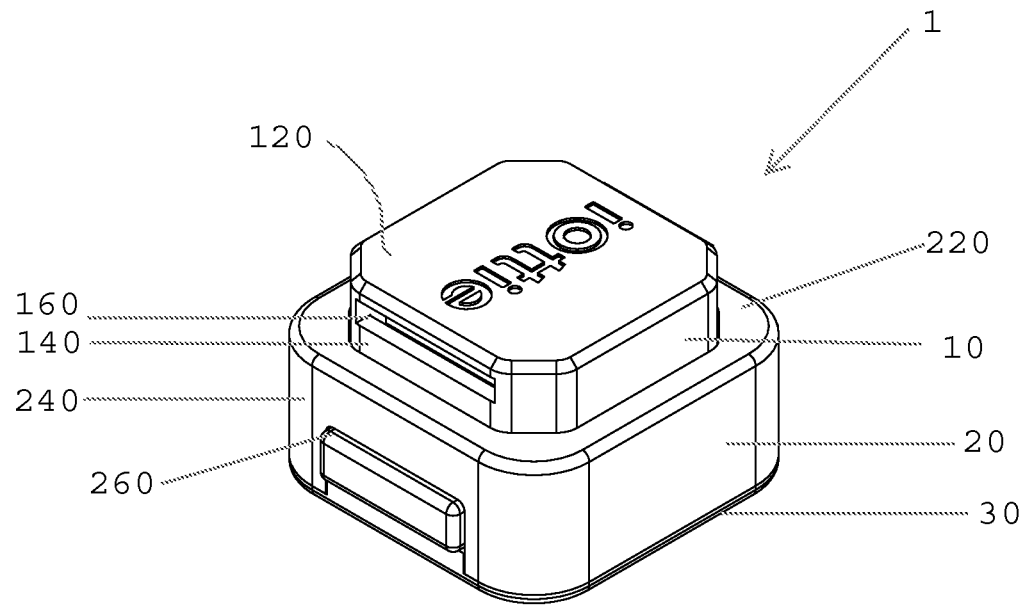
FIG. 1 is a perspective view of a mounting system according to at least one embodiment.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
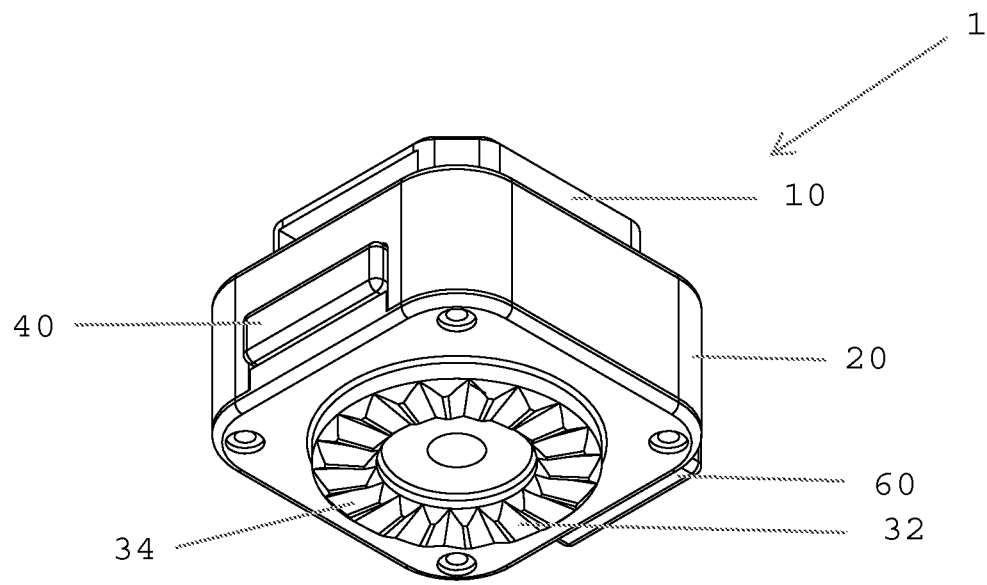
FIG. 2 is another perspective view of the mounting system of FIG. 1.

FIG. 1 is a top-side perspective view of a mounting system according to at least one embodiment. FIG. 2 is bottom-side perspective view of the mounting system of FIG. 1.

Referring to FIGS. 1 and 2, the mounting system 1 includes a top case 10 formed in a substantially cubic shape although other shapes are within the scope of various embodiments. The top case has a top surface 120 which may contact with a portable device when the portable device is mounted to the mounting system 1. The top case 10 further has two pairs of side faces 140 opposing each other. The top case 10 further includes a pair of slots 160 on one pair of side surfaces 140 of the top case 10, respectively. The top case 10 is a push switch. When a portable device is disposed onto the top surface 120 of the top case 10, the top case 10 is pushed by the portable device toward the bottom case 20. An operation of pushing the push switch/top case 10 and mounting the portable device onto the mounting system will be described later in connection with FIGS. 4 and 5.

The mounting system 1 further includes a bottom case 20. The bottom case 20 includes a top surface 220 and two pairs of side surfaces 240. The top case 10 is coupled to the bottom case 20. In one or more embodiments, the bottom case 20 receives the top case 10 from the top surface 220. The bottom case 20 further includes a pair of openings 260 on a pair of side surfaces 240, respectively. As shown in FIGS. 1-2, the bottom case 20 is larger than the top case 10 and formed in a substantially cubic shape although other shapes are within the scope of various embodiments.

The mounting system 1 further includes a cover 30 engaged with the bottom case 20 when the mounting system 1 is assembled. The bottom cover 30 has an inner surface engaged with the bottom case 20 and an outer surface facing away the bottom case 20. The bottom cover 30 is provided with an engaging unit 32 on the outer surface. The engaging unit 32 includes a plurality of teeth 34 for coupling the mounting system 1 with a coupling unit (not shown in the drawings) for positioning the mounting system onto certain locations. Other arrangements for coupling the mounting system 1 with a coupling unit are within the scope of various embodiments. In some embodiments, through the coupling unit, the mounting system may be coupled to an adhesion-type holder, e.g., a suction cup (not shown in the drawings). When the adhesion-type holder is fixed to a dashboard or a windshield of a vehicle, or a handle of a bike, a portable device including a mobile phone or a tablet can be attached to the adhesion-type holder through the mounting system. Accordingly, the portable device can be used easily while the user is driving.

The mounting system 1 further includes, in one or more embodiments, at least one arm protruding from a side of the top and bottom cases 10, 20. At least one embodiment includes two arms, e.g., first and second arms 40, 60 as shown in FIGS. 1 and 2. Other numbers of arms are within the scope of various embodiments. The arms 40 and 60 are buttons. The mounting system 1 as illustrated in FIGS. 1 and 2 have the first and second arms 40 and 60 in a pushed state.

Figure 3:
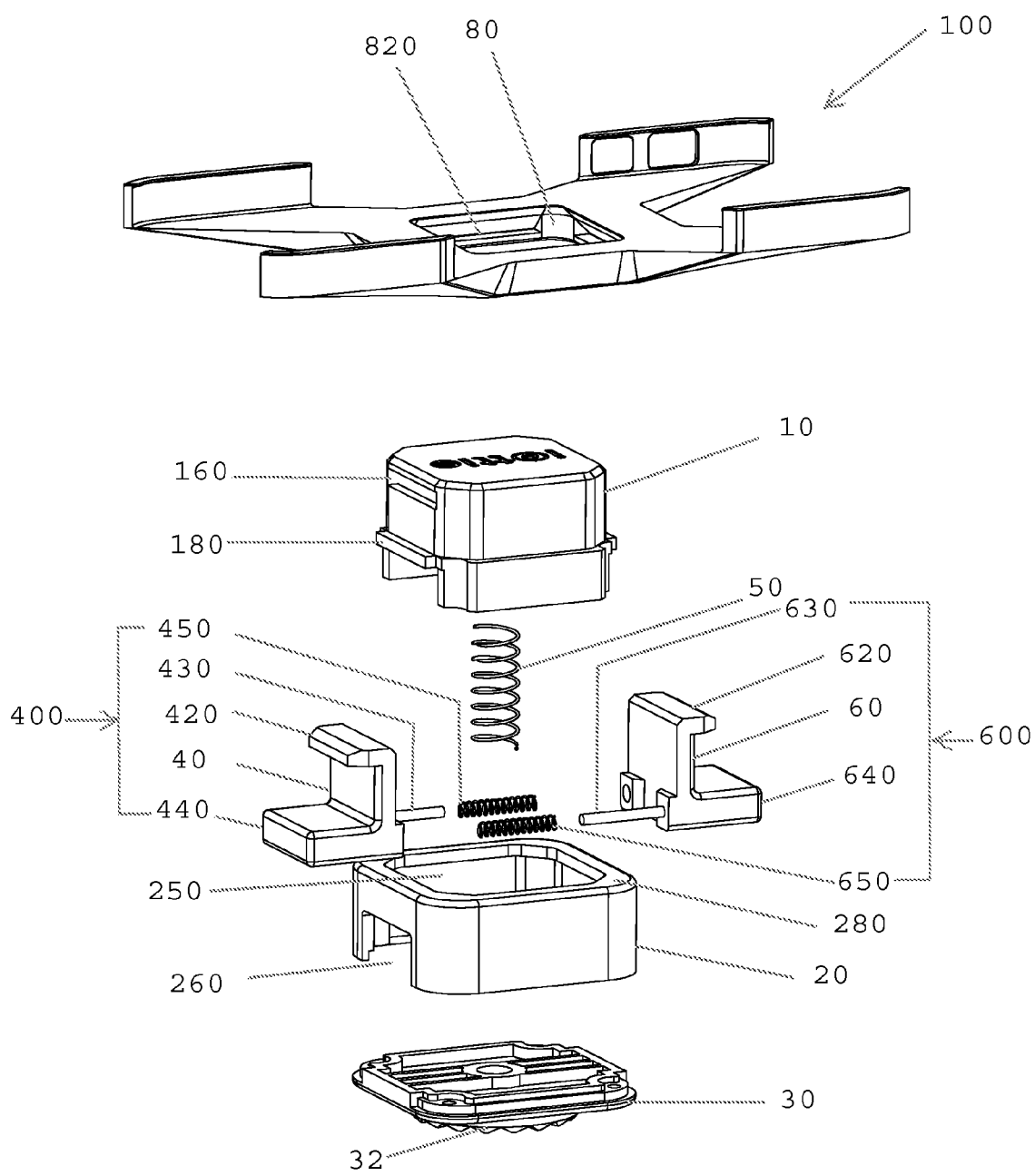
FIG. 3 is an exploded perspective view of the mounting system of FIG. 1.

FIG. 3 is an exploded perspective view of the mounting system 1. The bottom case 20, in one or more embodiments, includes a top opening 250 through which the top case 10 is inserted. Furthermore, the top case 10 includes one or more coupling protrusions 180 formed at designated positions on the same side as the slots 160 along a pair of side surfaces 140. The top case 10 and the bottom case 20 may be coupled with each other through the coupling protrusions 180 when the protrusions 180 are engaged with top flanges 280 of the bottom case 20. Other arrangements for coupling the top case 10 with the bottom case 20 are within the scope of various embodiments.

The mounting system 1 includes, in one or more embodiments, at least one attach/detach control unit. At least one embodiment includes first and second attach/detach control units 400 and 600 which will be described below. Other numbers of control units are within the scope of various embodiments. In particular, referring to FIG. 3, the first attach/detach control unit 400 includes a first arm 40 having a first section 420 and a second section 440, a first arm moving shaft 430 elastically biasing the second arm 40, a first arm elastic member 450 on the first arm moving shaft 430. The first section 420 and the second section 440 are spaced from each other in a push direction (B in FIG. 6(*b*)) of the top case 10. The first arm 40 including the first and second sections 420, 440 is formed of a C shape. A length of the second section 440 in a push direction (A-A' in FIG. 6(*d*)) of the first arm 40 is greater than a length of the first section 420. When the second section 440 is pushed, the first arm moving shaft 430 applies a physical force to pressurize the first arm elastic member 450. The first arm 40 is a single piece although other configurations are within the scope of various embodiments.

Similarly, referring to FIG. 3, in one or more embodiments, the second attach/detach control unit 600 includes a second arm 60 having a first section 620 and a second section 640, a second arm moving shaft 630 elastically biasing the first arm 40, a second arm elastic member 650 on the second arm moving shaft 630. The first section 620 and the second section 640 are spaced from each other in the push direction of the top case 10. The second arm 60 including the first and second sections 620, 640 is formed of a C shape. A length of the second section 640 in the push direction of the second arm 60 is greater than a length of the first section 620. When the second section 640 is pushed, the second arm moving shaft 630 provides a physical force to pressurize the second arm elastic member 650. The second arm 60 is a single piece although other configurations are within the scope of various embodiments.

Further referring to FIG. 3, in one or more embodiments, a main elastic member 50 is housed inside the top case 10 and the bottom case 20. In at least one embodiment, the main elastic member 50 is disposed between the top case 10 and the bottom case 20 in the push direction of the top case 10 and between the first and second attach/detach control units 400 and 600 in the push direction of the first and second arms 40, 60. The main elastic member 50 elastically biases the top case 10 and the bottom case 20 away from each other.

In one or more embodiments, the first attach/detach control unit 400 is positioned opposite to the second attach/detach control unit 600. The first and second arms 40, 60 are disposed inside the top case 10 and the bottom case 20. In particular, the first sections 420, 620 of the first arm 40 and the second arm 60 are configured to protrude from the slots 160 of the top case 10. The second sections 440, 640 of the first arm 40 and the second arm 60 protrude outside from the corresponding openings 260 of the bottom case 20. The second sections 440, 640 have the lengths greater than first sections 420, 620, because the second sections 440, 640 protrude outside of the bottom case 20 more than the first sections when the top case 10 is pushed toward the bottom case 20. In other words, each of the second sections 440, 640 of the first and second arms 40 and 60 is a push button. The second sections 440, 640 are configured to be directly pushed by a user to cause the first sections 420, 620 to retract within the top case 10.

FIG. 3 further shows that the bottom cover 30 configured to snap onto the bottom case 20. Other arrangements for coupling the bottom cover 30 with the bottom case 20 are within the scope of various embodiments. In one or more embodiments, the cover 30 has a central region for positioning the main elastic member 50.

According to one or more embodiments, the mounting system 1 is configured to cooperate with a socket that can be provided in a case or any attachments or components of a portable device. For example, FIG. 3 shows at least one embodiment of the present disclosure where a socket 80 is provided in a case 100 configured to receive a portable device and the socket 80 is configured to cooperate with the mounting system 1. The case 100 can have any shapes or structures dependent upon the models of the portable devices. In particular, the socket 80 as shown in FIG. 3 includes four flanges 820—as the socket 80 is a rectangular or square shape corresponding to the shape of the top case 10 of the mounting system 1. The socket 80 includes four corresponding to the four flanges 820. Other numbers of the flanges for the socket are within the scope of various embodiments. After the socket 80 is placed onto the top case 10 of the mounting system 1, two teeth defined by the first sections 420, 620 of the first and second arms 40, 60 protrude outwardly to fit into a pair of opposing flanges 820 of the socket 80. Therefore, the portable device may be locked onto the mounting system 1 in place.

Figure 4:
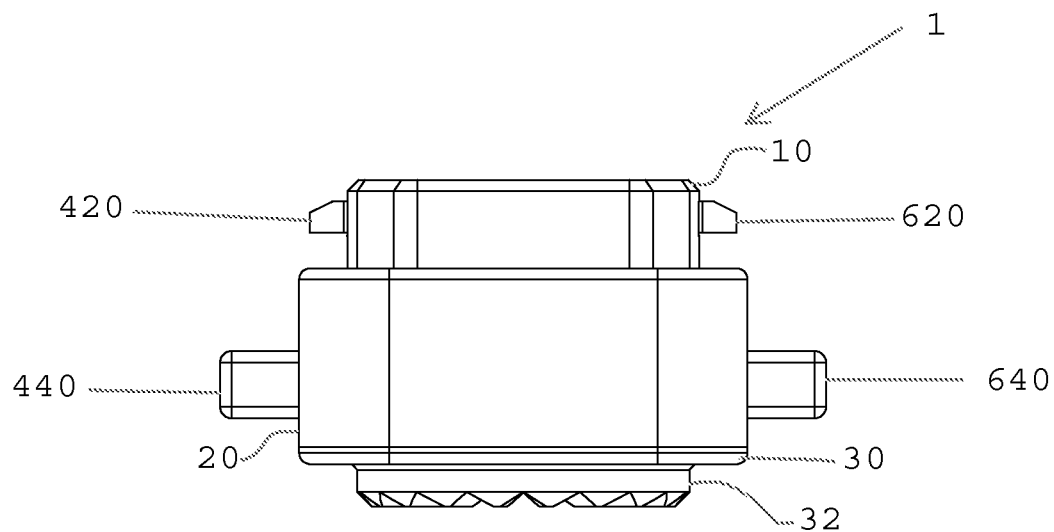
FIG. 4 is a side view of the mounting system of FIG. 1 when a top case is in a pushed state.

FIG. 4 is a side view of a mounting system 1 in a first state where the top case 10 is pushed downward and toward the bottom case 20. Specifically, in the first state, both of the first arm 40 and the second arm 60 are pushed outwardly. The first sections 420, 620 protrude outside the top case 10 from the slots 160 and define two teeth that may be engaged within the flanges 820 of the socket 80, which is illustrated in FIG. 3. At the same time, the second sections 440, 640 extend outside the bottom case 20 from the openings 260 at a first predetermined distance.

Figure 5:
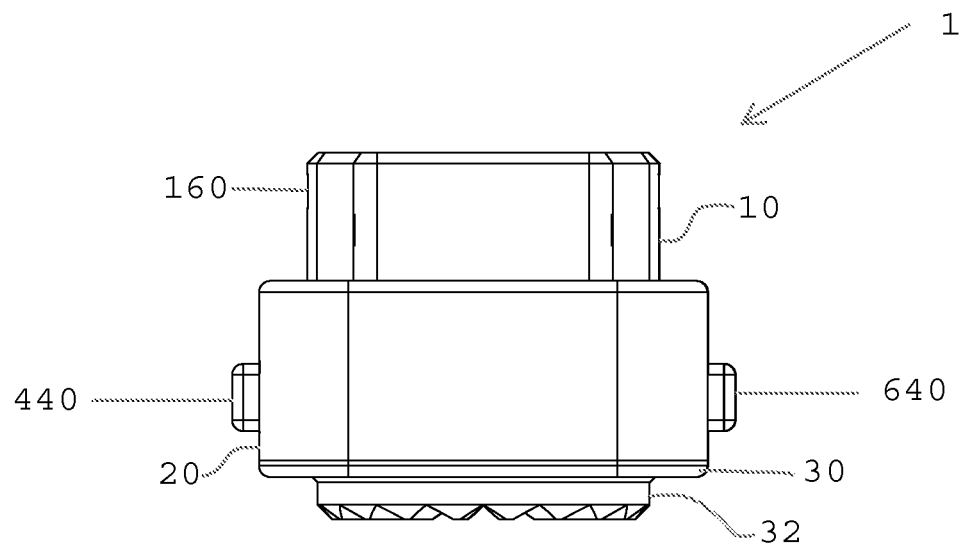
FIG. 5 is a side view of the mounting system of FIG. 1 when the top case is in a non-pushed state.

FIG. 5 is a side view of the mounting system 1 in a second state where the top case 10 is not pushed and the first and second arms 40 and 60 are pushed toward the inside of the top case 10 and the bottom case 20. In the second state, the second sections 440, 640 of the first and second arms 40, 60 extend outwardly from the bottom case 20 in a second predetermined distance that is shorter than the first predetermined distance. Further, the first sections 420, 620, i.e., the teeth, of the first and second arms 40, 60 are moved inside the top case 10 by the operation of pushing the second sections 440, 640. The first sections 420, 620 are completely moved inside of the top case 10. The at least one elastic member 450 or 650 is configured to be pressurized by the first and second arms 40, 60. When a portable device is attached to the mounting system 1, the first sections 420, 620 protrude outside of the top case 10. In order to detach the portable device from the mounting system 1, the second sections 440, 640 of the first and second arms 40, 60 are pushed inward so as to push the first sections 420, 620 to be completely inside of the top case 10, as shown in FIG. 5. Further, upon moving the first sections 420, 620 inside of the top case, the top case 10 moves upwardly to return its original position. Compared with the first and second states shown in FIGS. 4 and 5, the top case 10 protrudes from the bottom case 20 in the first state more than in the second state. In one or more embodiments of the mounting system, the top case 10 may be disengaged with the flanges 820 of the socket 80 (FIG. 4) and detach the portable device (now shown) from the mounting system 1 by pushing the first and second arms 40, 60.

Referring to FIGS. 4 and 5, in a first state where the top case is pushed toward the bottom case and a first distance is between the first and second arms, the first sections protrude outside from the top case, and in a second state where the second sections are pushed toward each other and a second distance smaller than the first distance is between the first and second arms, the first sections do not protrude outside from the top case or protrude outside from the top case less than in the first state. The second distance can be zero according to one or more embodiments of the mounting system.

FIGS. 6(a)-6(d) show a method of mounting a portable device to the mounting system.

Figure 6A:
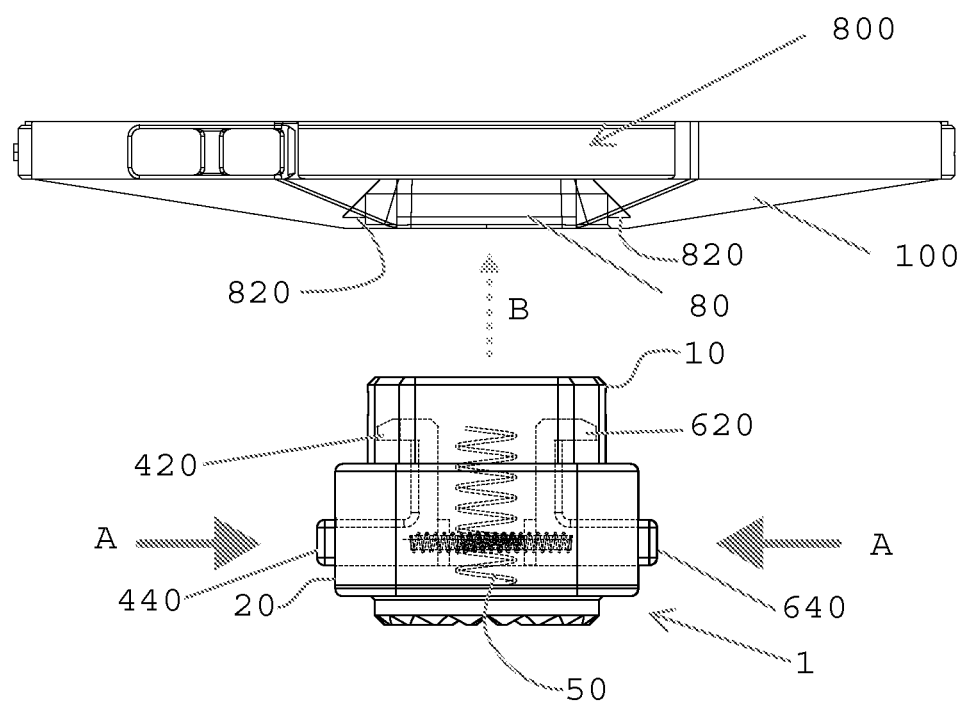
FIGS. 6(a)-6(d) are side views showing a method of mounting a portable device to the mounting system of FIG. 1.

Referring to FIG. 6(a), a portable device 800 with a receiver 100 is not attached to the mounting system 1, the first and second arms 40, 60 of the mounting system 1 are being pushed inward to compress the first and second elastic members 450, 650 toward each other, e.g., along the arrows A and A. Accordingly, the first sections 420, 620 of the first and second arms 40, 60 are pushed completely inside of the top case 10 so that the top case 10 can be placed in the socket 80. In one or more embodiments, edges of the first sections may flush with edges of the corresponding slots. The second sections 440, 640 of the first and second arms 40, 60 are pushed into the bottom case 20. Unlike the first sections 420, 620, the second sections 440, 640 are not pushed completely inside of the bottom case 20. Rather, the second sections 440, 640 are partially exposed outside of the bottom case 20 for a user to press later again when the portable device is to be detached from the mounting system 1 along the arrow B as shown in a dotted line.

Figure 6B:
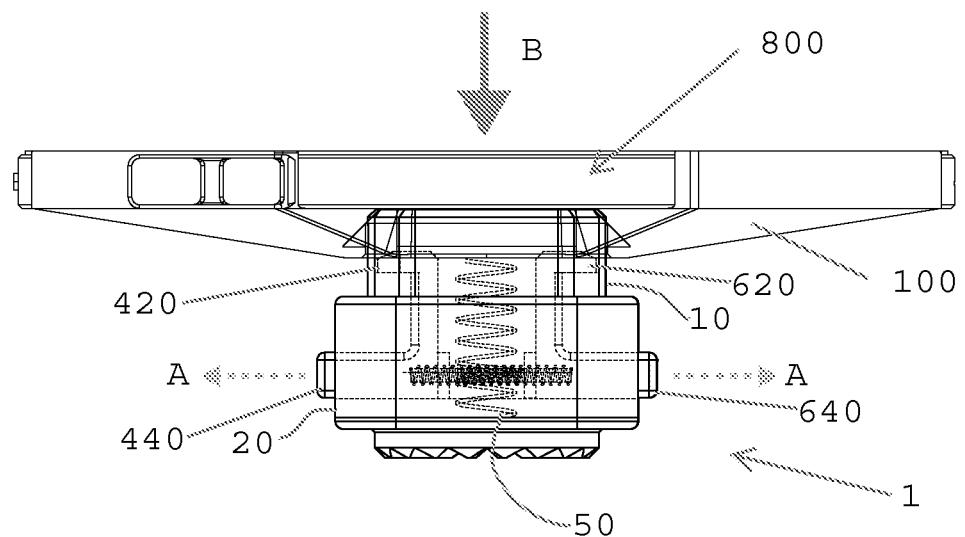

Referring to FIG. 6(b), the portable device 800 is being pressed onto the top case 10 by placing the socket 80 of the receiver 100 over the top case 10, and the top case 10 is pushed by the portable device toward the bottom case 20 along the arrow B. The arrows A in a dotted line of FIG. 6(b) indicate an extension direction of the first and second arms 40, 60 of FIG. 6(c).

Figure 6C:
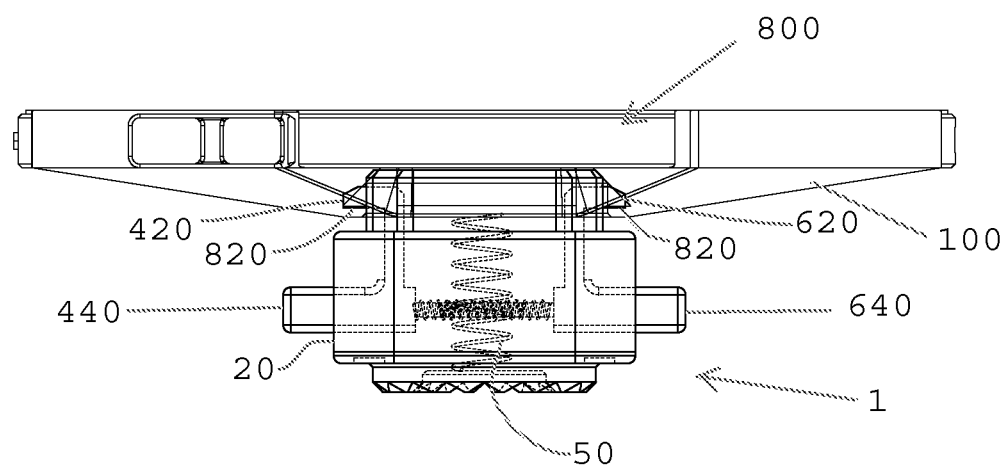

Referring to FIG. 6(c), after pressing the portable device 800 onto the top case 10, the top case 10 is fitted into the socket 80 and the first and second arms 40, 60 protrude outwardly and then the first sections 420, 620 engage with the flanges 820 of the socket 80. The main elastic member 50 is compressed by the load of the portable device 800. Accordingly, the mounting system 1 is locked with the receiver 100, and then the portable device is securely attached to the mounting system 1.

Figure 6D:
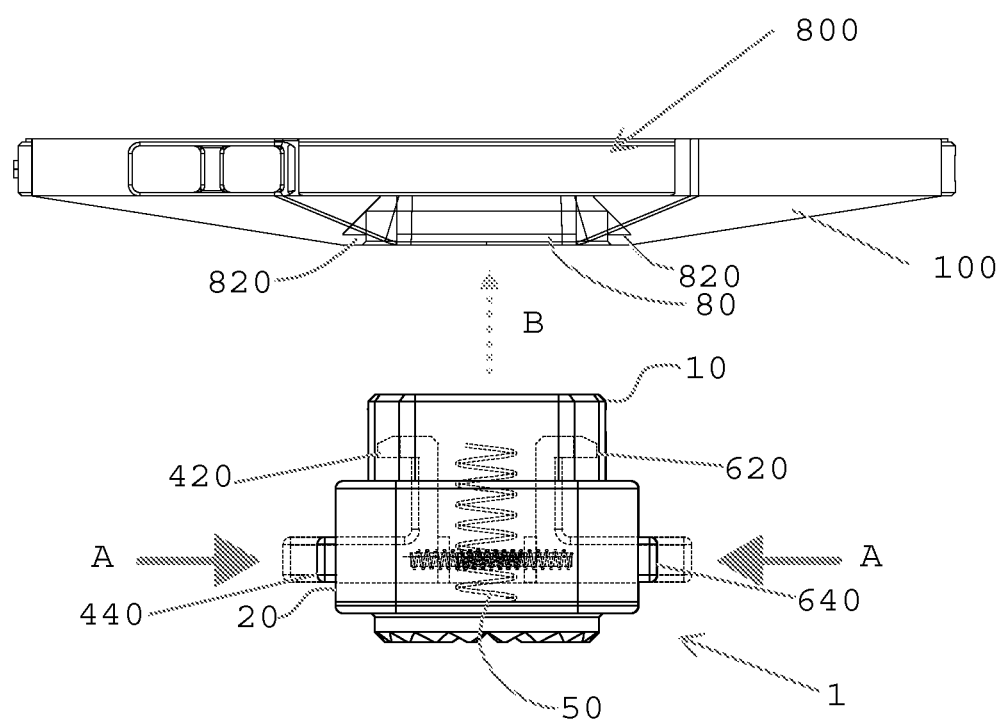

Referring to FIG. 6(d), when the second sections 440, 640 are pushed inwardly along the arrows A and A and the first sections 420, 620 are pushed inside of the top case 10. In this way, the first sections 420, 620 are disengaged with the flanges 820 of the socket 80 to unlock the mounting system from the receiver 100 and therefore detaching the mounting system 1 from the portable device 800 along the arrow B as shown in a dotted line. Upon separating the top case 10 from the socket 80, the top case 10 returns to its original state, i.e., the main spring 50 is no longer pressurized by the top case 10.

As such, portable devices having various sizes may be held by the mounting system 1 when the portable devices are attached to a receiver, e.g., a case, having a socket with flanges. The portable devices are not only mobile phones, but also tablets which in general have sizes bigger than mobile phones. When a user owns a mobile phone and a tablet, the user usually needs to buy two mounting devices for the mobile phone and the tablet. However, some embodiments of the mounting system can be suitable for different sized portable devices, e.g., the mounting system can be used for a mobile phone or a tablet. In this case, the user does not have to buy two different mounting systems for mounting the phone and the tablet.

Further according to some embodiments, a portable device may be stably secured on the mounting system only by a simple operation of pressing the portable device or the receiver with the socket onto the mounting system, e.g., the top case 10. Further, the portable device may be detached from the mounting system by a simple operation of pressing the buttons at both sides of the mounting system, e.g., the second sections 440, 640 of the first and second arms 40, 60. Therefore, it is possible to stably lock a portable device onto a mounting system without perform a complicated manipulation.

Further, since the operation of mounting a portable device onto the mounting system and the operation of releasing the portable device from the mounting system are performed by expansion and compression of the springs, the manufacturing cost may be reduced.

In some embodiments, a mounting system for a portable device includes a top case, a bottom case, and first and second arms. The bottom case is coupled to the top case. The first and second arms are arranged on two sides of the top case and the bottom case and spaced away from each other. Each of the first and second arms include a first section and a second section. In a first state where the top case is pushed toward the bottom case and a first distance is between the first and second arms, the first sections protrude outside from the top case. In a second state where the second sections are pushed toward each other and a second distance smaller than the first distance is between the first and second arms, the first sections do not protrude outside from the top case or protrude outside from the top case less than in the first state.

In some embodiments, a mounting system for a portable device includes a top case, a bottom case, and first and second arms. The bottom case is coupled to the top case. The first and second arms are arranged on two opposite sides of each of the top case and the bottom case and spaced away from each other. At least one embodiment further includes a main elastic member, and at least one elastic member between the first and second arms and elastically biasing the first and second arms away from each other. The main elastic member is disposed between the top case and the bottom case and elastically biasing the top case and the bottom case away from each other. Each of the first arm and the second arm has a C shape. The bottom case includes an outer face having an engaging member configured to engage with a coupling unit for positioning the mounting system.

In some embodiment, a kit includes a receiver and a mounting system. The receiver is configured to receive a portable device and includes a socket with flanges. The mounting system includes a top case, a bottom case, and at least one arm. The bottom case is coupled to the top case.

The at least one arm is configured to be inserted into the socket of the receiver and has a first section and a second section. The first section is configured to be engaged with the flanges when the mounting system is fixed to the receiver.

Some embodiments disclosed herein provide a mounting system which a user can easily mount a portable electronic device to and which can be used for portable devices of different sizes by using appropriate receivers.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A mounting system for a portable device comprising:
    a top case;
    a bottom case coupled to the top case; and
    first and second arms on two sides of the top case and the bottom case and spaced away from each other,
        wherein
        each of the first and second arms include a first section and a second section;
        in a first state where the top case is pushed toward the bottom case and a first distance is between the first and second arms, the first sections protrude outside from the top case;
        in a second state where the second sections are pushed toward each other and a second distance smaller than the first distance is between the first and second arms, the first sections do not protrude outside from the top case or protrude outside from the top case less than in the first state; and
        the second sections protrude outside from the bottom case more in the first state than in the second state.

2. The mounting system according to claim 1, wherein each of the first arm and the second arm is a single piece.

3. The mounting system according to claim 1, wherein each of the first arm and the second arm has a C shape.

4. The mounting system according to claim 1, wherein a length of each of the second sections is greater than that of the corresponding first section, and the second sections are configured to be directly pushed by a user to cause the first sections to retract within the top case.

5. The mounting system according to claim 1, wherein the bottom case includes an outer face having an engaging member configured to engage with a coupling unit for positioning the mounting system.

6. The mounting system according to claim 1, further comprising a main elastic member disposed between the top case and the bottom case and elastically biasing the top case and the bottom case away from each other, wherein in the first state, the main elastic member is configured to be pressurized by the top case.

7. The mounting system according to claim 1, further comprising at least one elastic member between the first and second arms and elastically biasing the first and second arms away from each other, wherein in the second state, the at least one elastic member is configured to be pressurized by the first and second arms.

8. The mounting system according to claim 1, further comprising a first control unit including:
    a first shaft joined to the first arm; and
    a first elastic member disposed along the first shaft and elastically biasing the second arm.

9. The mounting system according to claim 8, further comprising a second control unit opposing the first control unit and including
    a second shaft joined to the second arm; and
    a second elastic member disposed along the second shaft and elastically biasing the first arm.

10. The mounting system according to claim 1, wherein each of the top case and the bottom case has a rectangular shape.

11. A mounting system for a portable device comprising:
    a top case;
    a bottom case coupled to the top case; and
    first and second arms arranged on two opposite sides of each of the top case and the bottom case and spaced away from each other,
        wherein
        a main elastic member disposed between the top case and the bottom case and elastically biasing the top case and the bottom case away from each other;
        at least one elastic member between the first and second arms and elastically biasing the first and second arms away from each other;
        each of the first arm and the second arm has a C shape; and
        the bottom case includes an outer face having an engaging member configured to engage with a coupling unit for positioning the mounting system.

12. The mounting system according to claim 11, wherein each of the first and the second arms includes an upper protruding portion and a lower protruding portion,
    the top case includes opposite side slots,
    the bottom case includes opposite side openings,
    the first and second arms are coupled to the top and bottom cases by the upper protruding portions passing through the side slots, and the lower protruding portions passing through the side openings.

13. The mounting system according to claim 12, wherein said at least one elastic member composes:
    a first elastic member arranged inside of the bottom case, on a first shaft joined to the first arm, and biasing the second arm away from the first arm; and
    a second elastic member arranged inside the bottom base, on a second shaft joined to the second arm, and biasing the first arm away from the second arm.

14. The mounting system according to claim 11, wherein each of the first and the second arms include a first section and a second section.

15. The mounting system according to claim 14, wherein a length of each of the second sections is greater than that of the corresponding first section, and the second sections are configured to be directly pushed by a user to cause the first sections to retract within the top case.

16. The mounting system according to claim 11, further comprising a first control unit including:
    a first shaft joined to the first arm; and
    the at least one elastic member comprising a first elastic member disposed along the first shaft and elastically biasing the second arm.

17. The mounting system according to claim 16, further comprising a second control unit opposing the first control unit and including:
    a second shaft joined to the second arm; and the at least one elastic member comprising a second elastic member disposed along the second shaft and elastically biasing the first arm.

18. The mounting system according to claim 11, wherein each of the top case and the bottom case has a rectangular shape.

\* \* \* \* \*